United States Patent [19]
Daoud

[11] Patent Number: 6,083,011
[45] Date of Patent: Jul. 4, 2000

[54] CONNECTOR SWITCHING MECHANISM WITH IMPROVED CAP RETENTION

[75] Inventor: Bassel Hage Daoud, Parsippany, N.J.

[73] Assignee: Lucent Technologies Inc., Murray Hill, N.J.

[21] Appl. No.: 09/127,170

[22] Filed: Jul. 31, 1998

[51] Int. Cl.$^7$ ........................................ H01R 29/00
[52] U.S. Cl. .............................. 439/49; 439/507
[58] Field of Search .................. 439/49, 507, 510, 439/709

[56] References Cited

U.S. PATENT DOCUMENTS

| | | | |
|---|---|---|---|
| 4,913,663 | 4/1990 | Siemon et al. | 439/509 |
| 5,235,638 | 8/1993 | Dondero | 379/399 |
| 5,412,715 | 5/1995 | Volpe | 377/326 |
| 5,478,244 | 12/1995 | Maue et al. | 439/510 |

Primary Examiner—Steven L. Stephan
Assistant Examiner—Amir Abdulmelik
Attorney, Agent, or Firm—Stroock & Stroock & Lavan LLP

[57] ABSTRACT

A tool-less insulation displacement connector block for selectively routing wiring connections contains a first terminal strip, a second terminal strip and a third terminal strip which are disposed on the connector block. The first terminal strip has a first wire receiving terminal which is electrically connected to a first output connector. The second terminal strip has a second wire receiving terminal which is electrically connected to a second output connector. Similarly, the third terminal strip has a third wire receiving terminal which is electrically connected to a third output connector. The connector block also contains a unitary cap which encapsulates the first, second and third output connectors. The cap has a bridging device which can be used for selectively connecting either the first output connector or the third output connector to the second output connector thereby establishing an electrical connection between the second wire receiving terminal and the selected output connector.

12 Claims, 5 Drawing Sheets

CONNECTOR SWITCHING MECHANISM WITH IMPROVED CAP RETENTION

FIELD OF THE INVENTION

This invention relates generally to the field of telephone wire connectors and distribution systems, and specifically to an improved switching mechanism for selectively routing wiring connections on a connector block.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the individual tip ring wire pairs must first be broken out from the cable into individual wire pairs. This is normally accomplished in a junction box such as, for example, a building entrance protector (BEP), or network interface unit (NIU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block may be hard wired to a multi pair connector, most typically a twenty-five pair connector of the RJ21 type, for further connection to, for example, an array of customer bridges which are also hard wired and connectorized via a mating RJ21 connector. The use of a customer bridge permits a subscriber to disconnect terminal equipment from a telephone line so that subscriber can isolate troubles on the line as originating in the telephone network, or on the terminal equipment side of the telephone line.

Additionally, there are known insulation displacement connector (IDC) blocks for use in such junction boxes and/or distribution fields, such as the ubiquitous punch down connector block, also known as a 66-type connector block, and the tool-less insulation displacement connector bocks utilizing push cap connectors, such as that described in U.S. Pat. No. 4,913,659 dated Apr. 3, 1990, the entire disclosure of which is incorporated herein by reference. Such a tool-less connector block is com merci ally available under the product designation SC99 from Lucent Technologies inc.

Generally, a 66-type connector block has one or more rows of two connectors dedicated to each tip or ring wire from the telephone central office. Each of these connectors can be electrically hard wired to provide telephone service to a different end user. The incoming tip or ring wire can be selectively routed to provide service to a different end user by connecting it to a specific connector. Generally, the connectors on a 66-type connector block comprise a terminal strip with an insulation displacement connector (IDC) at one end which receives the tip or ring wire from the telephone central office, usually through a protector field known in the art. Thus, a row of two adjacent connectors may be configured for the hard wired attachment of a tip or ring wire to the first connector in a row, with the second connector hard wired to an RJ21-type connector mounted near the connector block. To connect the first connector to the second, a bridging clip, known in the art, is used to connect the connectors at the IDC ends. If it is desired to connect the first connector elsewhere, the bridging clip is removed, and a wire is punched down on the IDC end of the first connector and routed to its desired endpoint, generally an alternate connector on the connector block, where it is punched down once more. This is an extremely labor-intensive operation which must be performed every time the desired output connector is changed. Moreover, where tool-less IDCs are utilized, such as, for example, the SC 99 tool-less IDC connector block sold by Lucent Technologies Inc., multiple wire connections must be made to alternately route wires from the SC 99 to other connectors or endpoints.

Additionally, as known in the art, in the 99-type connector block, a cap covers each terminal strip and holds the wire in position. The tip and ring wires held within such tool-less IDC connectors are strain relieved only to the extent held by the compressive force exerted by the IDC terminal holding the bare wire which has been stripped of its insulation layer. While this prior art IDC works for its intended purpose, a significant drawback to this prior art IDC is that pulling on the wire, intentional or otherwise, can cause the cap to be dislodged from the terminal strip thereby breaking the connection. Thus, it is desirable to provide for an easier switching mechanism between output connectors on a tool-less IDC connector block without having to perform any actual wiring operations and a switching mechanism that will better resist dislodging caused by any pulling on a wire connected thereto.

SUMMARY OF THE INVENTION

The present invention is directed at overcoming the shortcomings of the prior art. Generally speaking, in accordance with the present invention, a tool-less IDC connector block for selectively routing wiring connections comprises a first terminal strip, a second terminal strip and a third terminal strip disposed on the connector block. The first terminal strip has a first wire receiving terminal which is electrically connected to a first output connector, the second terminal strip has a second wire receiving terminal which is electrically connected to a second output connector, and the third terminal strip has a third wire receiving terminal which is electrically connected to a third output connector. The connector block also has a unitary cap which encapsulates the first, second and third output connectors. The cap has an integral bridging device which can be used for selectively connecting either the first output connector or the third output connector to the second output connector, thereby selectively establishing an electrical connection between the second wire receiving terminal and a selected output connector. The cap can be connected in a first position such that it connects the first output connector to the second output connector. The cap can then be removed and reconnected in a second position such that it now connects the previously unconnected output connector, in this case the third output connector, to the second output connector.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
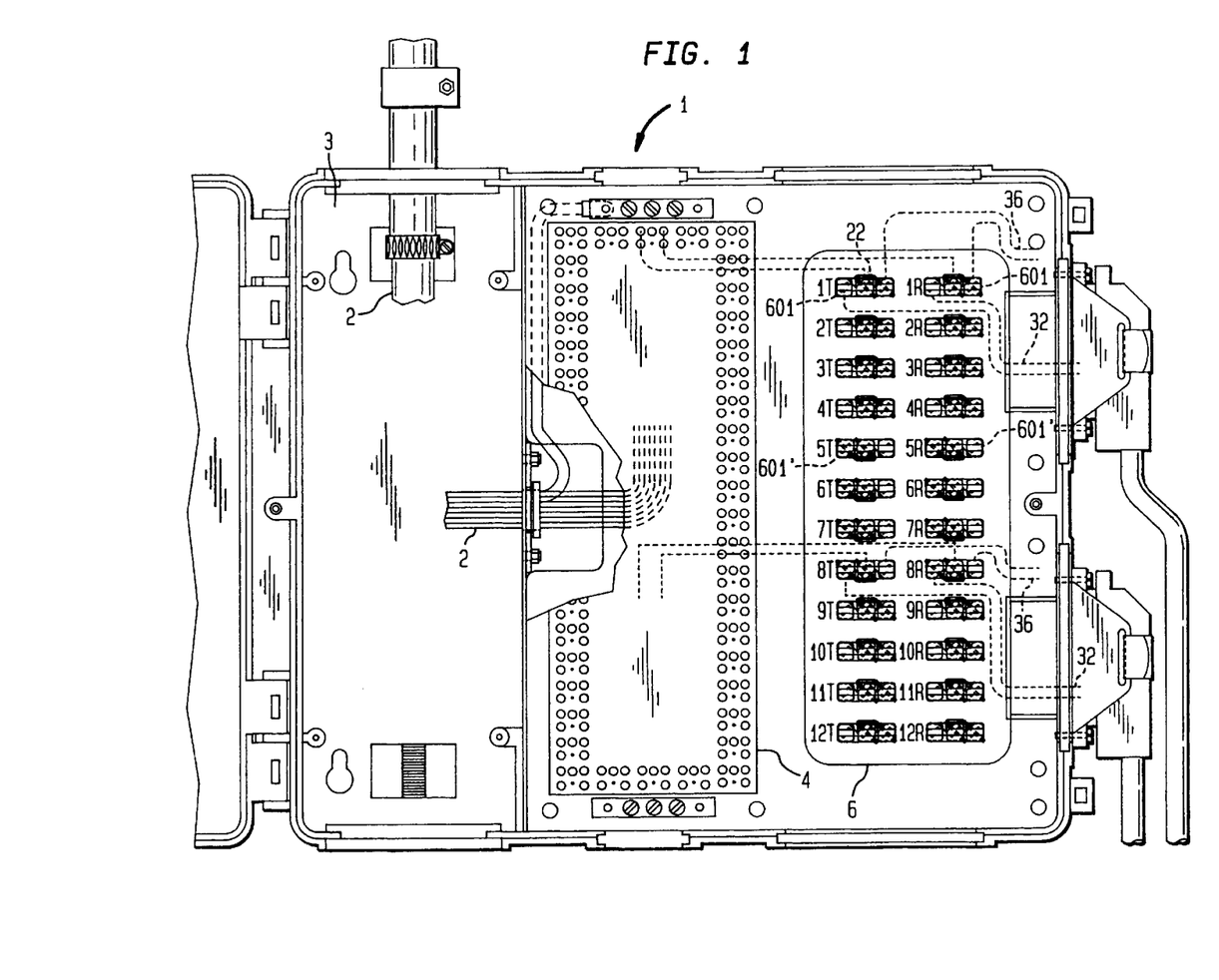
FIG. 1 is a front view of an embodiment of a selectively routed connector block in accordance with the present invention deployed in a telephone junction box.

Reference is first made to FIG. 1, which illustrates a 99-type tool-less insulation displacement connector (IDC) block 6 in accordance with the present invention, located within an enclosure generally indicated as 1. By way of non-limiting example, enclosure 1 can be a building entrance protector (BEP) or a network interface unit (NIU), or some other art recognized telephone wire junction box, or no enclosure may be used, the block being directly mounted to a backboard or surface mounted connector field. The term junction box as used herein is used interchangeably to represent any surface or enclosure to which the connector block may be mounted.

Enclosure 1 consists of a splice chamber 3 of a type known in the art, for receiving a feeder cable 2 consisting of multiple pairs of electrical conductors, each pair representing the tip and ring leads of a telephone line coming from a telephone central office or other network facility. It is also possible for the invention to be utilized in private branch exchange (PBX) or centrex environments, with the lines being PBX lines or centrex lines or other network lines. Indeed, the skilled practitioner will recognize, from the teachings herein, the applicability of the present invention to myriad telephone distribution applications. Enclosure 1 may be fabricated of metal, plastic, synthetic resin or any combination thereof, or any other material suitable to the application in which the invention will be deployed, as a matter of design choice.

The individual differing wire pairs from feeder cable 2 may be connected through input connectors or through direct wire terminations, in a manner known to the art, to a protector field 4. In a preferred embodiment, protector field 4 may contain a protector device for providing over voltage protection on the telephone line for each tip ring wire pair.

Figure 2:
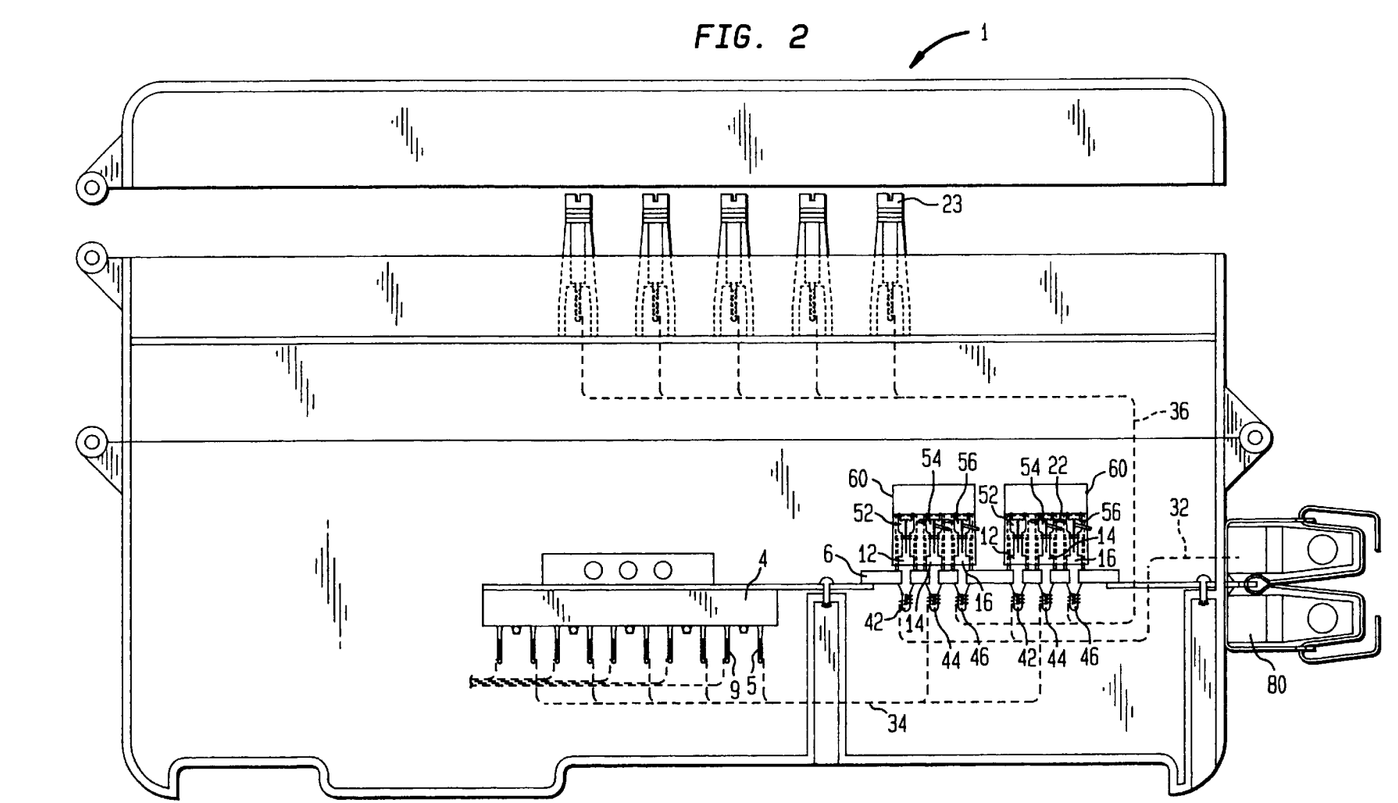
FIG. 2 is a bottom cutaway view of the connector block of FIG. 1 with an electrically established customer bridge connection.

Referring again to FIG. 1, connector block 6 has two columns and 12 rows of terminal strips arranged in sets of three. Of course, a person of skill will recognize that the number of rows and columns may be modified to accommodate any number of terminal strips in alternate embodiments of connector block 6. As shown in FIGS. 1 and 2, each row of terminal strips on connector block 6 has two sets of terminal strips, one for each tip or ring wire from the terminal central office. Thus, as shown in FIG. 1, a set of terminal strips in the first row and the first column, represented on the block by the label designation 1T, may be dedicated to a tip wire. The corresponding ring wire is then connected to the set of terminal strips in the first row and second column, represented by the designation 1R in FIG. 1. Clearly, such label designations are a matter of application specific design choice, although preferably the first row is dedicated to a first tip ring wire pair. Similarly, the next row is dedicated to the second tip ring wire pair, and so on.

Connector block 6, as seen in FIGS. 1 and 2, provides for 12 tip ring wire pairs, although the number of pairs included on a block is a matter of design choice. As illustrated in FIG. 1, the first set of terminal strips in the first column is dedicated to tip wires whereas the second set of terminal strips in the second column is dedicated to the corresponding ring wires. Each row of tip terminal strips in connector block 6 consists of a first terminal strip 12, a second terminal strip 14 and a third terminal strip 16 which are arranged in three tip columns. Thus, all the first terminal strips 12 of tip rows 1–12 form the first tip column, all the second terminal strips 14 of tip rows 1–12 form the second tip column, and all the third terminal strips 16 of tip rows 1–12 form the third tip column. Similarly, each row of ring terminal strips in connector block 6 consists of a first terminal strip 12, a second terminal strip 14 and a third terminal strip 16 which are also arranged in three columns. Thus, all the first terminal strips 12 of ring rows 1–12 form the first ring column, all the second terminal strips 14 of ring rows 1–12 form the second ring column, and all the third terminal strips 16 of ring rows 1–12 form the third ring column. The operation of each set of terminal strips in a tip row is identical to the operation of each set of terminal strips in a ring row.

Figure 3:
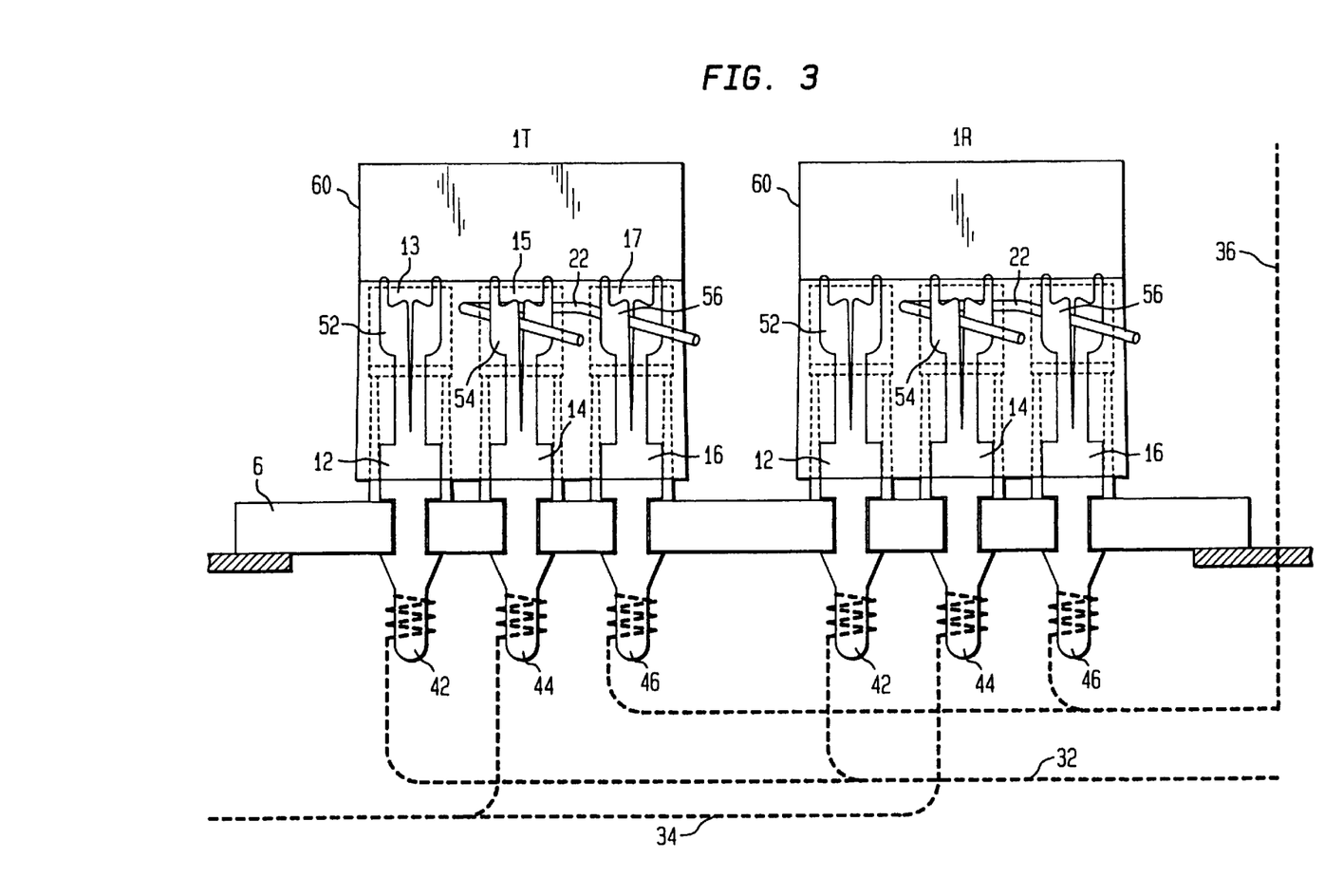
FIG. 3 is a detail view of the connector block of FIG. 2.

Reference is now made to FIGS. 2 and 3 which show that each terminal strip 12 in the first tip or ring column has a first wire wrap terminal 42 at one end and a first output connector 52 at the opposite end, configured as a conventional tool-less insulation displacement terminal (IDC) type connector. First wire wrap terminal 42 and first output connector 52 are electrically connected to each other, preferably being formed as the ends of a unitary terminal strip in the manner of a conventional 99-type terminal strip. Each terminal strip 14 in the second tip or ring column has a second wire wrap terminal 44 at one end and a second output connector 54 at the opposite end, as discussed previously in connection with terminal strip 12. Second wire wrap terminal 44 and second output connector 54 are electrically connected to each other, also as described above relative to terminal strip 12. Similarly, each terminal strip 16 in the third tip or ring column has a third wire wrap terminal 46 at one end and a third output connector 56 at the opposite end which are electrically connected to each other, as described above. Again, this structure is true for each set of terminal strips in the tip column as well as each set of terminal strips in the ring column, as shown in FIGS. 1, 2 and 3.

Reference is made again to FIGS. 2 and 3, which show that first output connector 52 of first terminal strip 12 is connected to a desired output point, in this case, by way of non-limiting example, an RJ21 connector 80 via a wire 32 connected to first wire wrap terminal 42. Third output connector 56 of third terminal strip 16 is electrically connected to a second output point, in this case, by way of non-limiting example, a customer bridge 23, which may contain an RJ11 connection (not shown), via a wire 36 connected to third wire wrap terminal 46. Second wire wrap terminal 44 of second terminal strip 14 is electrically connected to an input point, in this case, by way of non-limiting example, a protector field 4 via a wire protector field connection 34. Each set of terminal strips of connector block 6 is similar in design to the other set of terminal strips. Thus, the connections of first output connectors 52 and third output connectors 56 are the same for all 12 pairs of rows of connector block 6.

Figure 4:
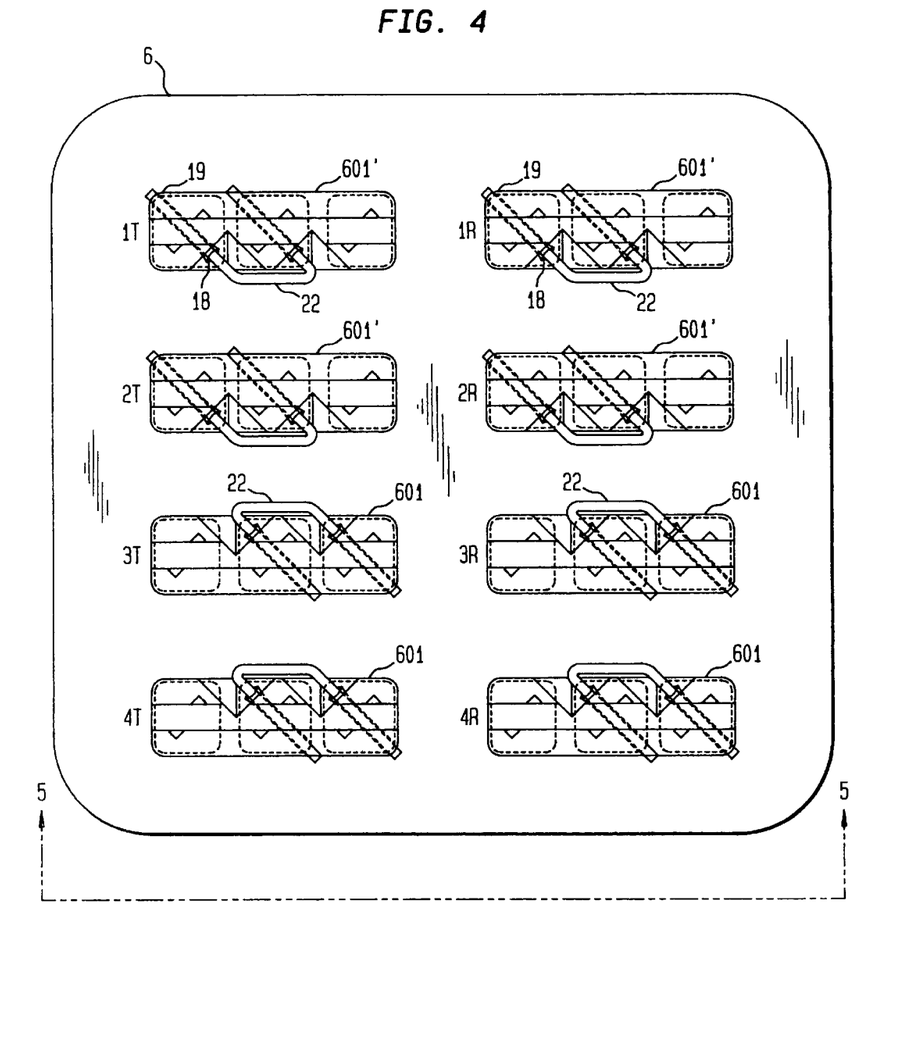
FIG. 4 is a top view of an alternate embodiment of a selectively routed connector block in accordance with the present invention.

Each set of connectors of connector block 6 also includes a unitary cap 60. Cap 60 can be removeably, securely mounted over first output connector 52, second output connector 54 and third output connector 56 such that it encapsulates or simultaneously covers the three output connectors. Cap 60 includes a first cavity 13, a second cavity 15 and a third cavity 17. When cap 60 is mounted on the three output connectors, each of the three output connectors fits inside one of the three cavities of cap 60. Thus, cap 60 may be mounted on the three output connectors in two positions, as depicted in FIGS. 1 and 4, and designated as position 601 and position 601'. Cap 60 may be mounted such that first output connector 52 fits inside first cavity 13, second output connector 54 fits inside second cavity 15 and third output connector 56 fits inside third cavity 17. Alternatively, cap 60 may be mounted on the three output connectors such that first output connector 52 fits inside third cavity 17, second output connector 54 fits inside second cavity 15, and third output connector 56 fits inside first cavity 13. Thus, if cap 60 is mounted on the three output connectors in the first position, it can be disconnected, rotated by a 180° and then reconnected so as to now be in the second position. Each cavity of cap 60 has an entrance aperture 18 and an exit aperture 19 which is in fluid communication with entrance aperture 18 as shown in FIG. 4. Cap 60 is formed to be moveable up and down on the connectors, in a manner known in the art, and also, through the application of additional force, to be completely removed from the connectors, also in a manner known in the art, through the engagement of mating protrusions and detents (not shown) formed respectively on the connectors and inner cap, in a manner known in the art.

Cap 60 also includes an electrically conductive bridging device, by way of non-limiting example, a bridging wire 22 as shown in FIGS. 1, 2 and 3. One end of bridging wire 22 passes through the entrance aperture 18 and the exit aperture 19 of second cavity 15, whereas the other end of bridging wire 22 can pass the entrance aperture 18 and exit aperture 19 of either first cavity 13 or third cavity 17. Bridging wire 22 can be removable or fixed within the cap, as a matter of design choice. That is, bridging wire 22 can be molded so as to be fixed into specific apertures of two of the three cavities of cap 60, or to bypass the apertures altogether and simply be molded into or within the cap 60 such that when cap 60 is pushed down onto the connectors, two adjacent connectors are electrically connected.

Reference is made again to FIG. 3 which shows cap 60 in a first position 601. Reference is also made to FIG. 4 which shows cap 60 in a second position 601'. In both positions, bridging wire 22 passes through cavities 15 and 17. Cap 60 can be alternated between these two positions by disconnecting cap 60 from the first position, rotating cap 60 by 180°, and reconnecting cap 60 in the second position.

In the first position when cap 60 is pushed to completely encapsulate first output connector 52, second output connector 54 and third output connector 56, bridging wire 22 is driven into contact with terminal strips 14 and 16 whereupon it is mechanically and electrically coupled to terminal strip 14 and terminal strip 16 in a manner known in the art. This coupling results in the establishment of an electrical connection between output connector 54 and output connector 56.

By disconnecting cap 60, rotating it by 180°, and reconnecting it into the second position 601' in FIG. 4, bridging wire 22 is driven into contact with terminal strips 12 and 14 whereupon it is mechanically and electrically coupled to terminal strip 12 and terminal strip 16. This results in the establishment of an electrical connection between output connector 52 and output connector 54.

In accordance with the invention, to selectively route an input to a selected one of two possible output points, bridging wire 22 may be selectively positioned to electrically connect second output connector 54 to either first output connector 52 or third output connector 56. Alternatively, if bridging wire 22 is permanently affixed within cap 60, cap 60 may be selectively positioned to encapsulate the three output connectors in a first position to electrically connect second output connector 54 to either first output connector 52 or third output connector 56, or in a second position wherein it is rotated by 180° from the first position, so as to electrically connect second output connector 54 to the previously unselected one of first output connector 52 or third output connector 56. Thus, as described and depicted in the exemplary embodiment described above and with reference to FIGS. 1, 2 and 3, an individual set of terminal strips on connector block 6 may have a connection to customer bridge 23 if bridging wire 22 is placed over third output connector 56 and second output connector 54, or a connection to RJ21 connector 80 if bridging wire 22 is placed over first output connector 52 and second output connector 54. Mounting cap 60 such that bridging wire 22 connects first output connector 52 and second output connector 54 establishes an electrical connection between second wire wrap terminal 44 and first output connector 52. Similarly, mounting cap 60 such that bridging wire 22 connects third output connector 56 and second output connector 54 establishes an electrical connection between second wire wrap terminal 44 and third output connector 56. Thus, in an exemplary embodiment, bridging wire 22 establishes a connection from the wire originating at the telephone central office to one of two output points without the need to manually perform any wiring operations. Bridging wire 22 can be made of any conducting material, as known in the art.

For special telephone lines, such as pay phones and switching lines, the connection from the central office may be terminated directly on connector block 6 by wiring a tip or ring wire pair directly to the IDC connector on terminal strip 14. In this case, access is denied to end users and the line can only be accessed by telephone company technicians with access to the connector block.

As illustrated in FIG. 2, the tip ring wire pair from the central office is connected to an input protector wire wrap terminal 9 located on protector field 4. Input wire wrap terminal 9 is electrically connected to output wire wrap terminal 5 within protector field 4. Output wire wrap terminal 5 is then connected to second wire wrap terminal 44 of terminal strip 14 on connector block 6 with second wrap terminal 44 being electrically connected to second output connector 54. Mounting cap 60, such that bridging wire 22 covers and electrically connects first output connector 52 and second output connector 54, establishes an electrical connection between second wire wrap terminal 44 and first wire wrap terminal 42. First wire wrap terminal 42 is electrically connected to RJ21 connection 32 which may be further connected to a multi-line network interface device in a manner known in the art. Thus, Mounting cap 60, such that bridging wire 22 connects first output connector 52 and second output connector 54, establishes an electrical connection between a tip ring wire pair from the central office and a multi-line network interface device.

Similarly, mounting cap 60, such that bridging wire 22 covers and electrically connects third output connector 56 and second output connector 54, establishes an electrical connection between second wire wrap terminal 44 and third wire wrap terminal 46. Third wire wrap terminal 46 is electrically connected to a customer bridge connector 23 by wire 36. Customer bridge connector 23 is a single-line network interface device (NID). Thus, mounting cap 60, such that bridging wire 22 connects third output connector 56 and second output connector 54, establishes an electrical connection between a tip ring wire pair from the central office and customer bridge connector 23.

Each tip or ring set of terminal strips disposed on connector block 6 has its own cap 60 and its own bridging wire 22. Bridging wire 22 may provide an electrical connection from an individual tip or ring set of terminal strips to an RJ11 connection or an RJ21 connection but not to both. In this manner, connector block 6 is being used as a switch to route input wires to selected output points. In order to change the output connection of a tip ring wire pair from an RJ11 connection to an RJ21 connection or vice versa, all a user has to do is re move cap 60 from the existing position (e.g., covering third output connector 56 and second output connector 54), rotate cap 60 by 180° and mount it so that it covers second output connector 54 and previously unselected first output connector 52. No manual reconnection of wires is required, thereby greatly reducing the time required to change the connection on connector block 6.

The unitary design of cap 60 provides for a firmer and stronger fit of cap 60 when it encapsulates first output connector 52, second output connector 54 and third output connector 56. In the prior art single disjoined caps were used to encapsulate the output connectors. Pulling on a wire passing through the entrance and exit apertures of the single caps could result in the caps being pulled out of place and disconnected from the output connector. This led to disruption in service due to the disconnection of the tip and ring wires from the central office to the output connection. The unitary design of cap 60 in the present invention provides for a firmer and stronger fit of cap 60 when it is mounted on, and encapsulates, first output connector 52, second output connector 54 and third output connector 56, such that it requires greater force to disconnect cap 60 from its connected, encapsulated position as compared to the single caps in the prior art. Thus, pulling on bridging wire 22, such as, for example, during testing, intentionally or otherwise, will not easily pull cap 60 out of place thereby maintaining the connection of the tip and ring wire from the central office to the final output connection.

Figure 5:
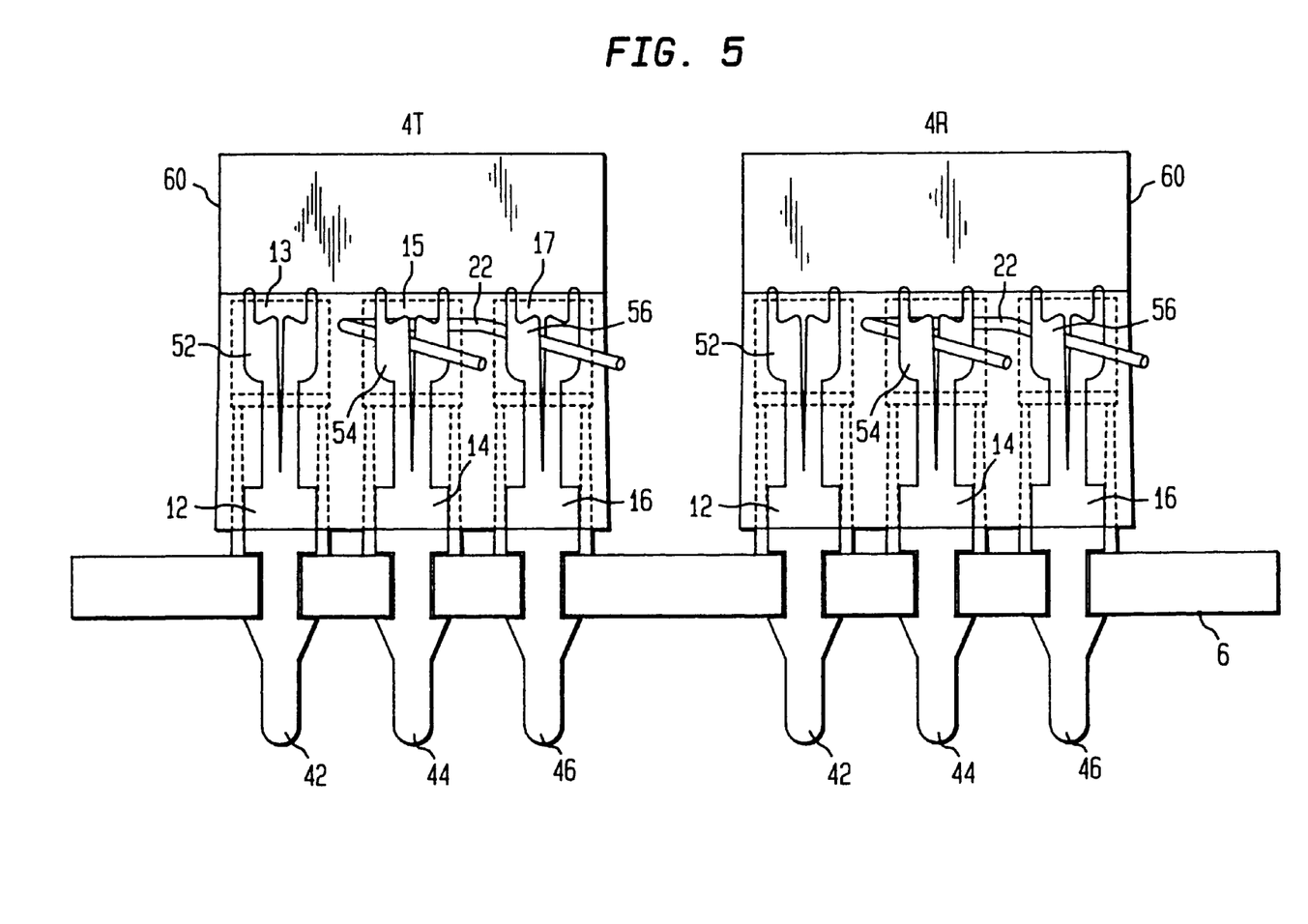
FIG. 5 is a bottom elevational view of the connector block of FIG. 4 viewed along the line 5—5 of FIG. 4 in accordance with the present invention.

Reference is made to FIGS. 4 and 5 which depict an alternate embodiment of the present invention. Connector block 6 of FIG. 4 provides for the connection of four tip and ring wire pairs from the central office to connector block 6. FIG. 5 is a side view of the connector block of FIG. 4 viewed along the line 5—5 of FIG. 4. Although, the terminal strips are at an angle when actually viewed from the side, they are shown full faced for clarity in this depiction. As shown in FIG. 4, a set of terminal strips in the first row and the first column, represented on the block by the label designation 1T may be dedicated to a tip wire. The corresponding ring wire is then connected to the set of terminal strips in the first row and second column, represented by the designation 1R in FIG. 4. Similarly, the set of terminal strips in the fourth row and the first column, represented on the block by the label designation 4T, may be dedicated to a tip wire and the set of terminal strips in the fourth row and second column, represented by the designation 4R in FIG. 4, is dedicated to a ring wire. 4T and 4R depict cap 60 in a first position whereas 1T and 1R depict cap 60 in the second position 601'. Cap 60 of 4T and 4R has bridging wire 22 in a position such that it connects second output connector 54 and third output connector 56. Alternatively, cap 60 of 1T and 1R has bridging wire 22 in the position such that it connects second output connector 54 and first output connector 52. It can be seen that cap 60 of 4T or 4R can be disconnected, rotated by 180°, and reconnected as shown by 1T and 1R for position 601'.

By providing for an easier switching mechanism for connection of an input telephone line from a central office to an output end user, the present invention eliminates the need to perform manual wiring operations each time a tip ring wire pair must be rerouted. The rerouting can be accomplished simply by disconnecting cap 60 from its first position 601, rotating cap 60 by 180° and reconnecting cap 60 in the second position 601'. Further, by providing for a unitary cap 60, any pulling on bridging wire 22, intentional or otherwise, does not result in the dislocation or dislodging of cap 60 from its connected and encapsulated position.

Of course, the person of skill will recognize that the terminal strip configuration may be modified to accommodate any of a number of terminal connector types for receiving wires at either end or at both ends of the terminal strip. Moreover, a conventional 99 type connector block can be readily modified to incorporate the present invention by providing the cap 60 and replacing conventional unitary caps with it.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A tool-less insulation displacement connector (IDC) block for selectively routing wiring connections, comprising:

a first terminal strip disposed on the connector block as part of a first tool-less IDC, the first terminal strip having a first wire-receiving terminal electrically connected to a first output connector;

a second terminal strip disposed on the connector block as part of a second tool-less IDC, the second terminal strip having a second wire-receiving terminal electrically connected to a second output connector;

a third terminal strip disposed on the connector block as part of a third tool-less IDC, the third terminal strip having a third wire-receiving terminal electrically connected to a third output connector; and a unitary cap selectively removably encapsulating the first, second and third output connectors, the cap having a bridging device selectively electrically connecting a selected one of the first output connector or the third output connector to the second output connector so as to selectively establish an electrical connection between the second wire receiving terminal and the selected one output connector by selectively moving said cap between a first position and a second position.

2. The connector block of claim 1, wherein the cap is capable of being removed from the first position connecting a selected one of the first output connector or the third output connector to the second output connector, rotated by 180° and reconnected so as to connect the previously unselected one of the first output connector or the third output connector to the second output connector.

3. The connector block of claim 1, wherein the bridging device is a wire.

4. The connector block of claim 1, wherein at least one of the first, the second and the third wire-receiving terminals is a wire wrap terminal.

5. The connector block of claim 3, wherein the wire is molded with the selected output connector and the second output connector to form a permanent connection.

6. A telephone wire junction box for selectively routing wiring connections therein, comprising:

a tool-less insulation displacement connector (IDC) block;

a first terminal strip disposed on the connector block as part of a first tool-less IDC, the first terminal strip having a first wire-receiving terminal electrically connected to a first output connector;

a second terminal strip disposed on the connector block as part of a second tool-less IDC, the second terminal strip having a second wire-receiving terminal electrically connected to a second output connector;

a third terminal strip disposed on the connector block as part of a third tool-less IDC, the third terminal strip having a third wire-receiving terminal electrically connected to a third output connector; and a unitary cap selectively removably encapsulating the first, second and third output connectors, the cap having a bridging device selectively electrically connecting a selected one of the first output connector or the third output connector to the second output connector so as to selectively establish an electrical connection between the second wire receiving terminal and the selected one output connector by selectively moving said cap between a first position and a second position.

7. The junction box of claim 6, wherein the bridging device is a wire.

8. The junction box of claim 6, wherein at least one of the first, the second and the third wire-receiving terminals is a wire wrap terminal.

9. The junction box of claim 6, wherein the first wire receiving terminal is electrically connected to an RJ21 connector and the third wire receiving terminal is connected to a customer bridge, such that having the bridging device connect the first output connector and the second output connector establishes an electrical connection between the second wire receiving terminal and the RJ21 connector whereas having the bridging device connect the third output connector and the second output connector establishes an electrical connection between the second wire receiving terminal and the customer bridge.

10. An insulation displacement connector (IDC) block comprising:

a first terminal strip disposed on the connector block as part of a first IDC, the first terminal strip having a first wire-receiving terminal electrically connected to a first output connector;

a second terminal strip disposed on the connector block as part of a second IDC, the second terminal strip having a second wire-receiving terminal electrically connected to a second output connector;

a third terminal strip disposed on the connector block as part of a third IDC, the third terminal strip having a third wire-receiving terminal electrically connected to a third output connector; and means for encapsulating the first, second and third output connectors and selectively electrically connecting the first output connector or the third output connector to the second output connector.

11. The IDC block of claim 10 wherein the means for encapsulating is selectively positionable in a first position, wherein the first output connector is electrically connected to the second output connector, or a second position, wherein the third output connector is electrically connected to the second output connector.

12. The IDC block of claim 10 wherein the means for encapsulating includes means for electrically bridging the first output connector or third output connector to the second output connector.

* * * * *